(12) United States Patent
Neitzke et al.

(10) Patent No.: US 9,305,534 B2
(45) Date of Patent: Apr. 5, 2016

(54) AUDIO SYSTEM FOR A MOTOR VEHICLE

(71) Applicant: GM GLOBAL TECHNOLOGY OPERATIONS LLC, Detroit, MI (US)

(72) Inventors: Carsten Neitzke, Hessen (DE); Justus Illium, Mainz (DE); Torsten Kanning, Eltville-Erbach (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/460,150

(22) Filed: Aug. 14, 2014

(65) Prior Publication Data

US 2015/0047495 A1 Feb. 19, 2015

(30) Foreign Application Priority Data

Aug. 14, 2013 (DE) .................. 20 2013 007 367 U (51) Int. Cl.
| | |
|---|---|
| *A63H 5/00* | (2006.01) |
| *G04B 13/00* | (2006.01) |
| *G10H 7/00* | (2006.01) |
| *B60W 40/09* | (2012.01) |
| *G10H 1/18* | (2006.01) |

(52) U.S. Cl.
CPC .............. G10H 7/008 (2013.01); B60W 40/09 (2013.01); G10H 1/18 (2013.01); *G10H 2210/391* (2013.01); *G10H 2220/351* (2013.01); *G10H 2240/081* (2013.01); *G10H 2240/085* (2013.01); *G10H 2240/131* (2013.01)

(58) Field of Classification Search
CPC .............. A63B 2024/0025; A63B 2071/0691; A63B 2220/12; A63B 2220/14; A63B 24/0021; A63B 24/0062; A63B 2071/0625; A63B 71/0686; A63B 2220/371; G10H 2220/371; G10H 2220/355
USPC ........................................ 84/609, 615
See application file for complete search history.

(56) References Cited

U.S. PATENT DOCUMENTS

| | | | |
|---|---|---|---|
| 7,521,623 B2 * | 4/2009 | Bowen ........................... 84/612 |
| 7,728,214 B2 * | 6/2010 | Oliver et al. ................... 84/612 |
| 8,108,083 B2 | 1/2012 | Kameyama | |
| 8,140,344 B2 | 3/2012 | Kameyama | |
| 8,341,557 B2 * | 12/2012 | Pisula et al. .................. 715/863 |
| 8,370,290 B2 * | 2/2013 | Kim et al. ...................... 706/62 |
| 8,375,106 B2 * | 2/2013 | Sparks .......................... 709/219 |
| 8,529,407 B2 * | 9/2013 | Nurmela et al. ................... 482/1 |
| 8,702,430 B2 * | 4/2014 | Dibenedetto et al. ......... 434/247 |
| 8,886,345 B1 * | 11/2014 | Izo et al. ........................ 700/94 |

(Continued)

FOREIGN PATENT DOCUMENTS

| | | |
|---|---|---|
| DE | 102006015332 A1 | 11/2006 |
| DE | 102007005627 A1 | 10/2007 |

(Continued)

*Primary Examiner* — Jeffrey Donels
(74) *Attorney, Agent, or Firm* — Ingrassia Fisher & Lorenz PC (57) ABSTRACT

An adaptive audio system for a motor vehicle is disclosed. The audio system is operable to retrieve a music item from a storage device, classify the music item in a predefined music category the basis of a determined audio profile, select a category from a plurality of predefined music categories on the basis of a current driving behavior of the driver, and output a music item included in the selected category via an output device. The driving behavior of the driver is understood to mean the mode or style in which the driver drives.

17 Claims, 5 Drawing Sheets

(56) References Cited

U.S. PATENT DOCUMENTS

| | | | |
|---|---|---|---|
| 2005/0160902 A1* | 7/2005 | Iwai et al. | 84/723 |
| 2005/0211078 A1* | 9/2005 | Iwai et al. | 84/723 |
| 2006/0243120 A1* | 11/2006 | Takai et al. | 84/612 |
| 2006/0253210 A1* | 11/2006 | Rosenberg | 700/94 |
| 2007/0113725 A1* | 5/2007 | Oliver et al. | 84/612 |
| 2008/0096726 A1* | 4/2008 | Riley et al. | 482/8 |
| 2008/0119994 A1 | 5/2008 | Kameyama | |
| 2009/0024233 A1* | 1/2009 | Shirai et al. | 700/94 |
| 2009/0025539 A1* | 1/2009 | Sagoo et al. | 84/609 |
| 2010/0088023 A1* | 4/2010 | Werner | 701/206 |
| 2010/0312369 A1* | 12/2010 | Dollar, Jr. | 700/94 |
| 2011/0040707 A1* | 2/2011 | Theisen et al. | 706/12 |
| 2011/0054646 A1* | 3/2011 | Hernandez et al. | 700/94 |
| 2013/0228063 A1* | 9/2013 | Turner | 84/612 |
| 2013/0263719 A1* | 10/2013 | Watterson et al. | 84/609 |
| 2014/0281971 A1* | 9/2014 | Isbell et al. | 715/716 |
| 2015/0007709 A1* | 1/2015 | Ghosh et al. | 84/612 |

FOREIGN PATENT DOCUMENTS

| | | |
|---|---|---|
| DE | 102007053470 A1 | 5/2008 |
| DE | 102010036666 A1 | 2/2011 |
| DE | 102012200671 A1 | 10/2012 |

* cited by examiner

AUDIO SYSTEM FOR A MOTOR VEHICLE

CROSS REFERENCE TO A RELATED APPLICATION

This application claims priority to German Patent Application No. 202013007367.5 filed Aug. 14, 2013, which is incorporated herein by reference in its entirety.

TECHNICAL FIELD

The technical field relates to an audio system for a motor vehicle, a software produce and a computer-readable medium.

BACKGROUND

An intelligent music selection method in a motor vehicle is DE 10 2010 036 666 A1. The method includes the step of learning the preferences of a user for a musical selection in the vehicle according to a plurality of driving conditions of the vehicle. An input displaying a current driving condition of the vehicle is received, and music is selected on the basis of the learned user preferences for a selection of music in the motor vehicle in accordance with the current driving condition.

SUMMARY

In accordance with the present disclosure an audio system for a motor vehicle, a software product and a computer-readable medium is provided that enable further improvement of a music selection and output.

According to one aspect of the present disclosure, an audio system for a motor vehicle is described. The audio system includes an output device that is designed to output audio signals. The audio system further includes a software product that, when running on the computing unit, instructs the computing unit to perform the following: retrieve at least one music item from at least one storage device, determine an audio profile for the at least one music item, classify the at least one music item in at least one of a plurality of predefined music categories on the basis of the determined audio profile, determine at least one parameter that characterizes a current driving behavior of the motor vehicle driver, classify the current driving behavior of the driver on the basis of the at least one determined parameter, select a category from the plurality of predefined music categories on the basis of the classified current driving behavior of the driver, and output at least one music item included in the selected category via the output device. The driving behavior of the driver is understood to mean the mode or style in which the driver drives.

The audio system according to the embodiment described enables a further improvement of a music selection and output method. This is assured in particular by the classification of the at least one music item retrieved in at least one of a plurality of predefined music categories based on the determined audio profile of the music item, the classification of the current driving behavior of the driver, the selection of a category from the plurality of predefined music categories based on the classified current driving behavior of the driver, and the output of at least one music item contained in the selected category by means of the output device. In this way, the classification of the music item may be carried out independently of a respective driving condition of the vehicle. Consequently, a period of time for which the music items are classified in the predefined music categories may advantageously be reduced, so that music can be selected and output on the basis of a classified current driving behavior of the driver as soon as possible after the vehicle has been put into operation, that is to say without the need to determine a large number of driving conditions of the vehicle.

In one embodiment of the audio system, the step of determining the audio profile of the at least one music item includes determining a volume profile and/or a tempo profile of the at least one music item. In this way, the at least one music item may be classified simply and reliably.

In a further embodiment of the audio system, the step of determining the at least one parameter includes determining at least one parameter selected from the group consisting of a speed of the vehicle, an acceleration of the vehicle, a steering angle, an accelerator pedal position, a brake pedal position and/or a setting of a driving mode controller. These parameters may be used to classify the current driving behavior of the driver most accurately by determining the acceleration behavior of the driver, the braking behavior and steering behavior of the driver, and/or the setting of the driving mode controller chosen by the driver, for example a sporty driving mode selected by the driver, and including such parameters for the purpose of classification.

In a further embodiment of the audio system, the step of retrieving the at least one music item includes retrieving at least one music item from at least one storage device that is external to the vehicle. This makes it possible for the largest possible number of music items to be provided for the step of music selection and output that is to be made on the basis of the driving behavior of the driver.

In a further embodiment of the audio system, the step of outputting the at least one music item begins at a predefined point in the music item. In this way, a point in the music item that corresponds most closely to the current driving behavior of the driver may be reproduced. For example, the output of the at least one music item may begin at a chorus in the music item.

The category may be selected from the plurality of predefined categories on the basis of an assignment, specifiable by user input, of at least one category of the plurality of predefined music categories to at least one behavior category from a plurality of predefined driving behavior categories.

In a further embodiment of the audio system, the computing unit is also instructed to determine a stage profile for a stage of a journey currently being traveled by a vehicle and/or a stage of a journey the vehicle is going to travel. The step of selecting the category from the plurality of predefined music categories is carried out in the embodiment described on the basis of the classified current driving behavior of the driver and on the basis of the determined stage profile. In this way, the step of selecting and outputting the music may also be adapted to the respective stage profile.

In a further embodiment of the audio system, the computing unit is also instructed to determine whether a user request to output a music item selected on the basis of the current driving behavior of the driver has been made. The category is selected from the plurality of predefined music categories, and the at least one music item is output if it is determined that a user request to output a music item selected on the basis of the current driving behavior of the driver via the output device has been made. In this way, the music selection and output based on the driving behavior of the driver may advantageously only be made in cases in which such is desired by the driver. The at least one music item may be output after a music item that is currently being played via the output device has ended. This prevents a sharp interruption in the playback of the music item currently being output. The output of the at least one music item may also take place immediately after the user instruction. For this, a fade effect may serve as the transition from a music item currently being played to the music item that is selected on the basis of the driving behavior of the driver, that is to say the currently output music item is faded out by gradually reducing the volume thereof, and the new music item is faded in by increasing the volume thereof correspondingly.

Another aspect of the application relates to a software product that, when running on a computing unit of a vehicle audio system having an output device that is designed to output audio signals, instructs the computing unit to perform the following: retrieve at least one music item from at least one storage device, determine an audio profile for the at least one music item, classify the at least one music item in at least one of a plurality of predefined music categories on the basis of the determined audio profile, determine at least one parameter that characterizes a current driving behavior of the motor vehicle driver, classify the current driving behavior of the driver on the basis of the at least one determined parameter, select a category from the plurality of predefined music categories on the basis of the classified current driving behavior of the driver, and output at least one music item included in the selected category via the output device.

In addition, a further aspect of the present disclosure relates to a computer-readable medium on which a software product according to the embodiment described is stored. The software product and the computer-readable medium according to the described embodiments have the advantages that were described in conjunction with the corresponding audio system, and these will not be repeated here to avoid further redundancy.

Another aspect of the application relates to a method for operating a vehicle audio system, wherein the audio system includes an output device that is designed to output audio signals. The method includes the following: retrieve at least one music item from at least one storage device, determine an audio profile for the at least one music item, classify the at least one music item in at least one of a plurality of predefined music categories on the basis of the determined audio profile, determine at least one parameter that characterizes a current driving behavior of the motor vehicle driver, classify the current driving behavior of the driver on the basis of the at least one determined parameter, select a category from the plurality of predefined music categories on the basis of the classified current driving behavior of the driver, and output at least one music item included in the selected category via the output device.

In one embodiment of the method, the step of determining the audio profile of the at least one music item includes determining a volume profile and/or a tempo profile of the at least one music item.

In a further embodiment of the method, the step of determining the at least one parameter includes determining at least one parameter selected from the group consisting of a speed of the vehicle, an acceleration of the vehicle, a steering angle, an accelerator pedal position, a brake pedal position and/or a setting of a driving mode controller.

In a further embodiment of the method, the step of retrieving the at least one music item includes retrieving at least one music item from at least one storage device that is external to the vehicle.

In a further embodiment of the method, the step of outputting the at least one music item begins at a predefined point in the music item.

In a further embodiment of the method, the step of selecting the category from the plurality of predefined music categories is carried out on the basis of an assignment, specifiable by user input, of at least one category of the plurality of predefined music categories to at least one driving behavior category from a plurality of predefined driving behavior categories.

In a further embodiment of the method, a stage profile for a stage of a journey currently being traveled by vehicle and/or a stage of a journey the vehicle is going to travel is determined. The step of selecting the category from the plurality of predefined music categories is carried out in the variant described on the basis of the classified current driving behavior of the driver and on the basis of the determined stage profile.

In a further embodiment of the method, a step is also carried out of determining whether a user request to output a music item via the output device, selected on the basis of the current driving behavior of the driver has been made. The step of selecting the category from the plurality of predefined music categories and outputting the at least one music item is carried out in the variant described if it is determined that a user request has been made to output a music item selected on the basis of the current driving behavior of the driver via the output device.

In a further embodiment of the method, the step of outputting the at least one music item is carried out after a music item that is currently being played via the output device has ended.

In a further embodiment of the method, the step of outputting the at least one music item is carried out immediately after the user request is confirmed.

Another aspect of the present disclosure relates to a device for operating a vehicle audio system, wherein the audio system includes an output device that is designed to output audio signals. The device for operating the audio system includes the following: means for retrieving at least one music item from at least one storage device, means for determining an audio profile for the at least one music item, means for classifying the at least one music item in at least one of a plurality of predefined music categories on the basis of the determined audio profile, means for determining at least one parameter that characterizes a current driving behavior of the motor vehicle driver, means for classifying the current driving behavior of the driver on the basis of the at least one determined parameter, means for selecting a category from the plurality of predefined music categories on the basis of the classified current driving behavior of the driver, and means for outputting at least one music item included in the selected category via the output device. A further improvement in the music selection and playback process is enabled by the described device for operating an audio system.

In one embodiment, the means for determining the audio profile of the at least one music item further include means for determining a volume profile and/or a tempo profile of the at least one music item. In this way, the at least one music item may be classified simply and reliably.

In a further embodiment, the means for determining the at least one parameter further include means determining at least one parameter selected from the group consisting of a speed of the vehicle, an acceleration of the vehicle, a steering angle, an accelerator pedal position, a brake pedal position and/or a setting of a driving mode controller. These parameters may be used to classify the current driving behavior of the driver most accurately by determining the acceleration behavior of the driver, the braking behavior and steering behavior of the driver, and/or the setting of the driving mode controller chosen by the driver, for example a sporty driving mode selected by the driver, and considering such parameters for the purpose of classification.

In a further embodiment, the means for retrieving the at least one music item includes means for retrieving at least one music item from at least one storage device that is external to the vehicle. This makes it possible for the largest possible number of music items to be provided for the step of music selection and output that is to be made on the basis of the driving behavior of the driver.

In a further embodiment, the means for outputting the at least one music item included in the selected music category includes means for outputting the at least one music item starting at a predefined point in the music item. In this way, a point in the music item that corresponds most particularly to the current driving behavior of the driver may be reproduced.

In a further embodiment, the means for selecting a category from the plurality of predefined music categories includes means for selecting the category from the plurality of predefined categories on the basis of an assignment, specifiable by user input, of at least one category of the plurality of predefined music categories to at least one behavior category from a plurality of predefined driving behavior categories. In this way, it is advantageously possible to personalise the assignment of music categories to the driving behavior categories.

In a further embodiment, the device for operating an audio system also includes means for determining a stage profile of a journey stage traveled by the vehicle and/or a stage of a journey the vehicle is going to travel. The means for selecting the category from the plurality of predefined music categories is designed in the embodiment described for selecting the category on the basis of the classified current driving behavior of the driver and on the basis of the determined stage profile. In this way, selecting and outputting the music may also be adapted to the respective stage profile.

In a further embodiment, the device for operating an audio system also includes means for determining whether a user request to output a music item selected on the basis of the current driving behavior of the driver has been made. The category is selected from the plurality of predefined music categories, and the at least one music item is output in the variant described if it is determined that a user request to output a music item selected on the basis of the current driving behavior of the driver by means of the output device has been made. In this way, the music selection and output on the basis of the driver's driving behavior may advantageously only be made in the cases in which such is desired by the driver of the vehicle.

In a further embodiment, the means for outputting the at least one music item is designed to output the at least one music item after a music item that is currently being played via the output device has ended. This prevents a sharp interruption in the playback of the music item currently being output.

In a further embodiment, the means for outputting the at least one music item is designed to output the at least one music item immediately after the user instruction is detected. For this purpose, a transition may be made from a music item currently being played to the music item selected on the basis of the driver's driving behavior by means of a fade effect, for example.

The vehicle may particularly be a motor vehicle, for example a motor car or truck.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
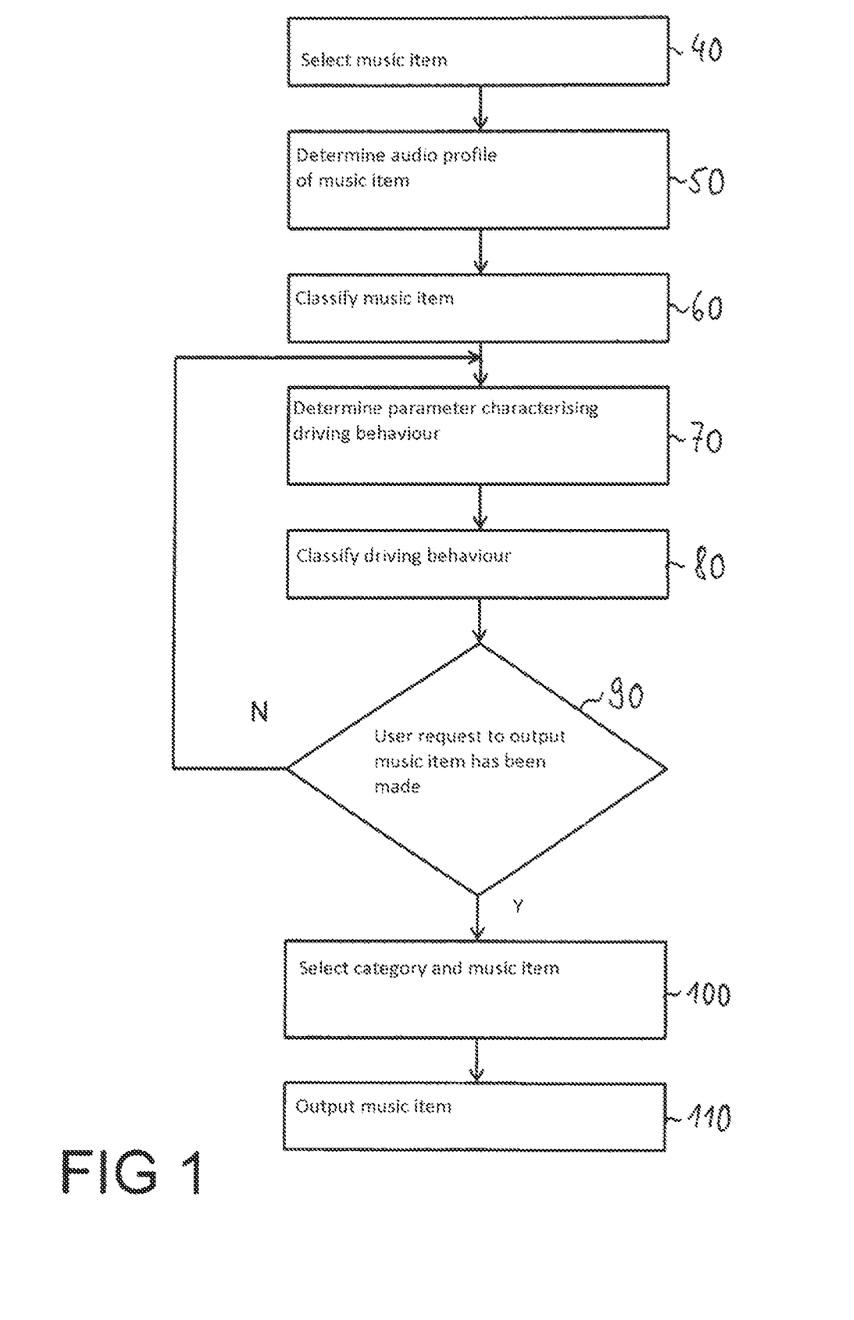
FIG. 1 shows a flowchart of a method for operating an audio system of a motor vehicle that is executed by means of a computing unit.

FIG. 1 shows a flowchart of a method for operating an audio system of a motor vehicle that is executed by means of a computing unit. The audio system includes an output device that is designed to output audio signals, and the vehicle is for example a motor vehicle, particularly a motor car or truck.

In a step 40, at least one music item is called off from at least one storage device. For example, at least one music item is called off from at least one storage device external to the vehicle. A music item or a plurality of music items may also be retrieved from an audio CD if the audio system is equipped with a CD player. Or, music items may also be retrieved from a USB stick, for example, if the audio system is equipped with a corresponding USB port.

In a step 50, an audio profile of the at least one music item is determined. In this context, the step of determining the audio profile may consist of determining a volume profile and/or a tempo profile of the at least one music item. For example, the beats per minute (bpm) of the music item may be calculated.

In a step 60, the at least one music item is classified in at least one of a plurality of predefined music categories on the basis of the audio profile determined in step 50. The predefined music categories may include for example a "Classical music" category, a "Rock music" category, a "Jazz music" category and a "Blues music" category. The at least one music item may also be classified in the at least one of the plurality of predefined music categories on the basis of data stored in the memory device relating to the performer, the track and/or a genre of the music item. Such data may be stored together with the music item in the storage device, for example, and particularly stored in the music item.

In a step 70, at least one parameter characterising a current driving behavior is determined. For this purpose, a current acceleration of the vehicle, a current steering angle, a current accelerator position, a current brake pedal position and/or a current setting of a driving mode control of the vehicle may be determined. The progression over time of said parameters may also be determined.

In a step 80, the current driving behavior of the driver is determined on the basis of the at least one parameter characterising a current driving behavior. For example the driving behavior of the driver may be classified in a number of predefined driving behavior categories. In particular, the driving behavior of the driver may be classified in one of the categories "sporty driving style", "normal driving style" and "defensive driving style".

In a step 90 in the embodiment shown, it is determined whether a user request has been made to output a music item selected on the basis of the current driving behavior of the driver. A user request may be made for example by operating a corresponding control element of the audio system, particularly by making an entry on a touchscreen of the audio system. A user request may also be made by selecting a driving mode that is set by means of the driving mode controller in the vehicle.

If it is determined in step 90 that a user request to output a music item selected on the basis of the current driving behavior of the driver has not been made, steps 70, 80 and 90 are repeated.

On the other hand, if it is determined in step 90 that a user request to output a music item selected on the basis of the current driving behavior of the driver has been made, in a step 100 a category is selected from a plurality of predefined music categories on the basis of the current driving behavior of the driver as classified in step 80. For example, if the current driving behavior of the driver was classified as a sporty style, the Rock music category is selected. Then, in step 100 a music item from the selected category is selected, that is to say a music item that was classified in the selected music category on the basis of the determined audio profile of the music item. If the category includes multiple music items, the music item is selected by means of a random function.

In a step 110, the music item selected in step 100 is output via the output device, beginning for example at a predetermined point in the music item.

In this context, the selected music item may be output after a music item that is being played back via the output device has finished playing. The output of the music item may also take place immediately after the user request is detected. For this purpose, a transition may be made from a music item currently being played to the music item that has been selected on the basis of the driving behavior of the driver by means of a fade effect.

Then, steps 70, 80 and 90 may be repeated, with steps 100 and 110 as necessary.

In a further embodiment of the method, a stage profile is determined for a stage of a journey currently being traveled by vehicle and/or a stage of a journey the vehicle is going to travel. The step of selecting the category from the plurality of predefined music categories is carried out in the embodiment described on the basis of the classified current driving behavior of the driver and on the basis of the determined stage profile.

An adaptive audio playback that offers the driver audio reproduction in keeping with the driver's driving behavior, and optionally with the stage profile, is enabled with the embodiment shown.

For this, music items are analysed for example with the aid of audio software, and characterized on the basis of the audio response. In this way, a music selection may be presented to the driver that is adapted according to the driver's driving profile or driving behavior. The driving profile or driving behavior may be determined for example using the speed, acceleration values, G forces, and/or an accelerator position. The stage profile may also be read using steering angles or navigation data—in advance in the case of a navigation system—and incorporated in the analysis.

The adaptive audio replay may be activated for example via an "intelligent" random function, particularly in conjunction with a driving mode switch, which may be switched to select a sporty, normal or touring mode, and/or another switch or input element. The adaptation may be used for all types of audio sources, particularly for music tracks or music items that have been retrieved via the internet. The music tracks may be changed only after playback of the current track has been completed, or also immediately with a fade effect into another music track. When changing tracks, it is also possible to skip to a certain point in the track, for example to the start of the chorus, to obtain a dynamic effect with immediate feedback.

In a further variant, the user has the option to make an input that defines which types of genre or playlist are to be played back in accordance with the driving behavior, and the driving behavior may be linked to the music categories via the driving modes listed above, for example, that is to say sporty, touring and normal modes.

An automatic preselection of music in keeping with the stage profile may also be defined in order to combat driver fatigue on long journeys.

If the vehicle is equipped with a driver assistance system with data logging and statistical analysis of the journey stages traveled, an appropriate selection of music may also be prepared for the appropriate times, for example if the vehicle is currently travelling over a stage that has already been logged and to which at least one music item has already been assigned.

The driving pleasure and driving comfort experienced by the driver may be further enhanced with the adaptive audio playback described in the preceding. In this context, it is generally accepted that music is able to affect a person's feeling of health and/or improve the feeling of well-being in various situations.

Figure 2A:
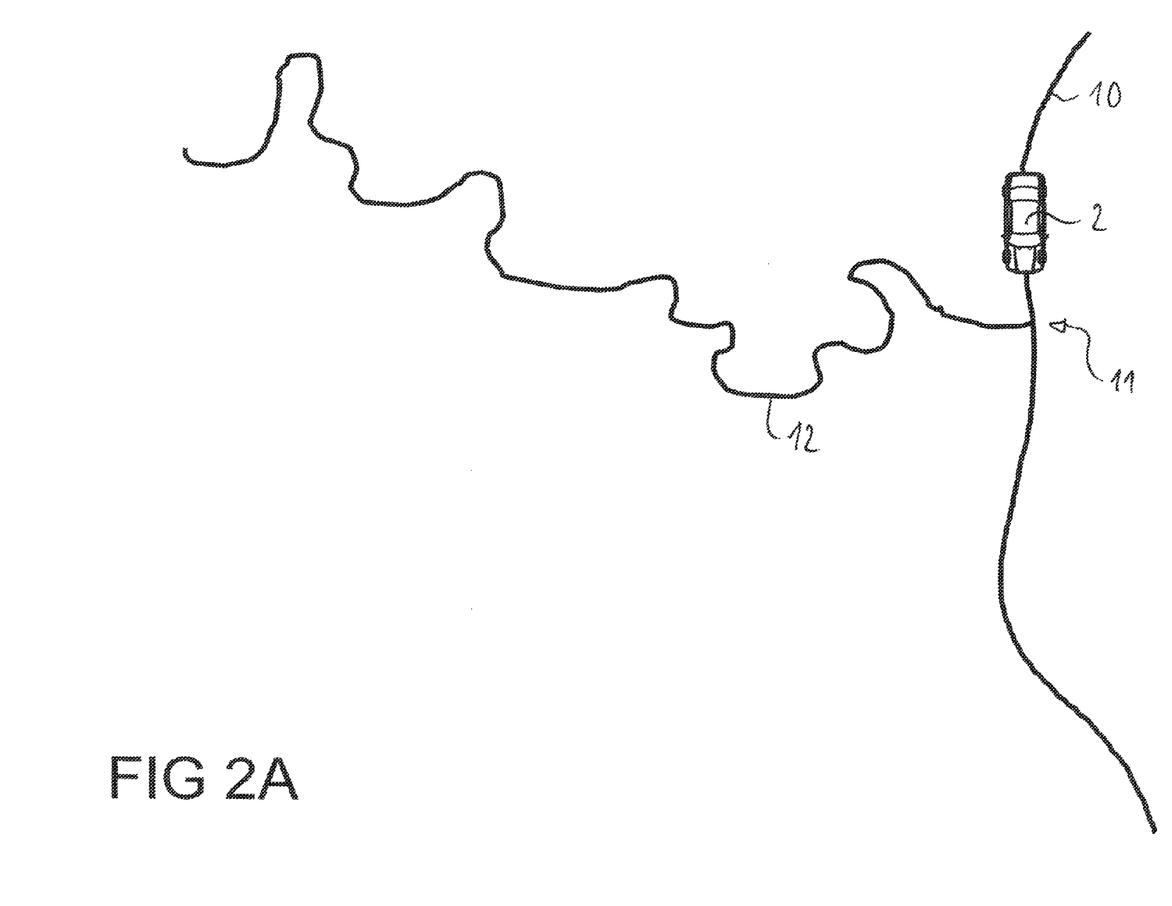
FIGS. 2A and 2B show an example of a driving situation in which a method that is executed by means of a computing unit may be implemented.
Figure 2B:
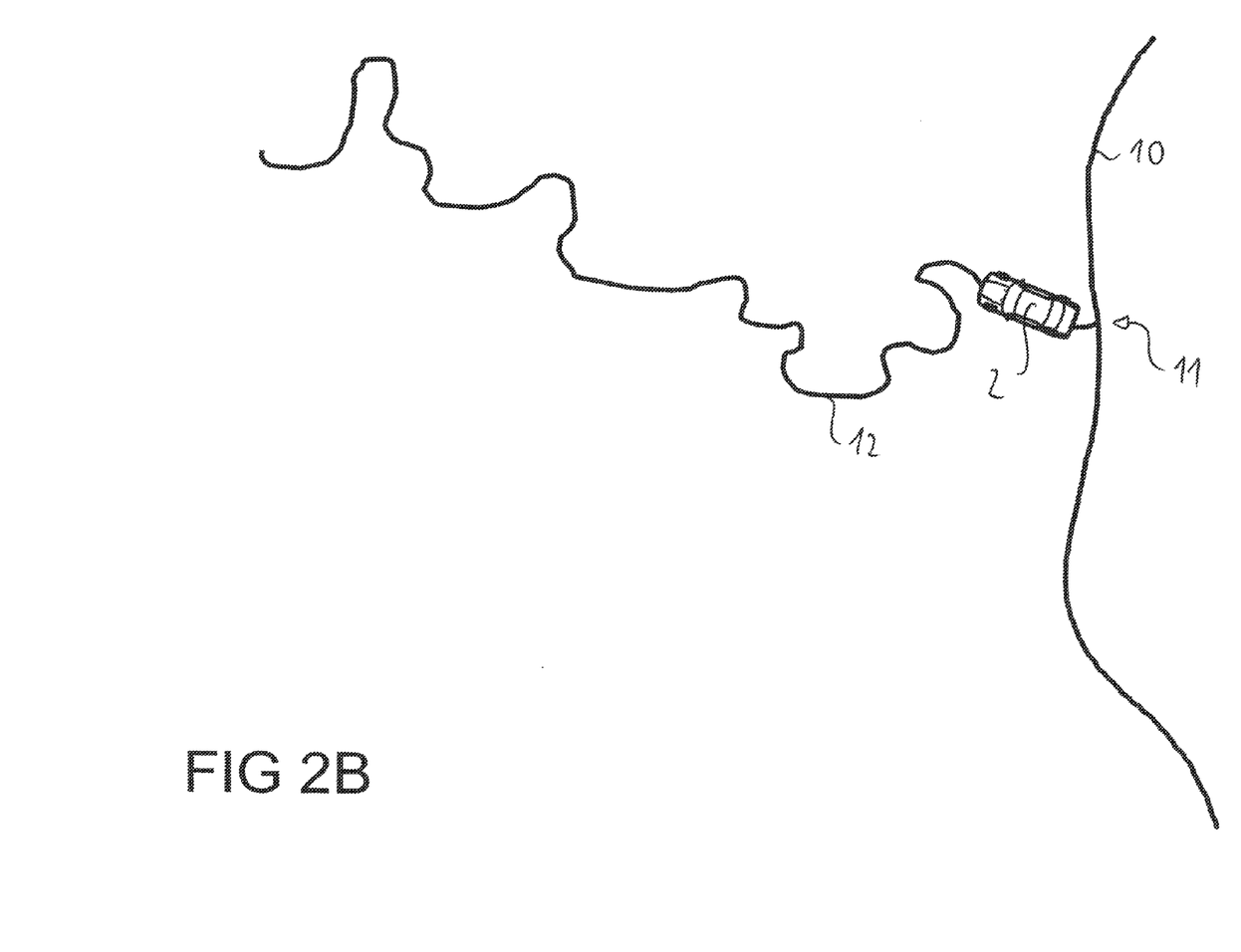

FIGS. 2A and 2B show an example of a driving situation in which a method for operating an audio system run by a computing unit may be implemented. FIG. 2A shows the driving situation at a first point in time, and FIG. 2B shows the driving situation at a later time.

At the first point in time, as represented in FIG. 2A, a motor vehicle 2 in the form of a motor car is travelling on a road 10. Ahead of vehicle 2 in the direction of travel thereof is a junction 11, where another road 12 joins road 10. Vehicle 2 turns off of road 10 and onto the other road 12, and at the second point in time is then located on road 12 as shown in FIG. 2B. Vehicle 2 is shown disproportionately enlarged compared with roads 10 and 12 in both FIGS. 2A and 2B. At the first point in time, shown in FIG. 2A, vehicle 2 is represented as travelling in touring mode, which may be selected by a driver of vehicle 2 actuating a driving mode controller, not shown in FIG. 2A. At the first time, vehicle 2 is also travelling at a constant speed and only low G forces are generated. Road 10 is also broad and spacious.

At the second point in time, shown in FIG. 2B, vehicle 2 is represented as travelling in sport mode, which has been selected by the driver of vehicle 2. Vehicle 2 is also travelling on second road 12, with changing speeds, and higher G forces are generated. Road 12 also features many tight bends.

Figure 3:
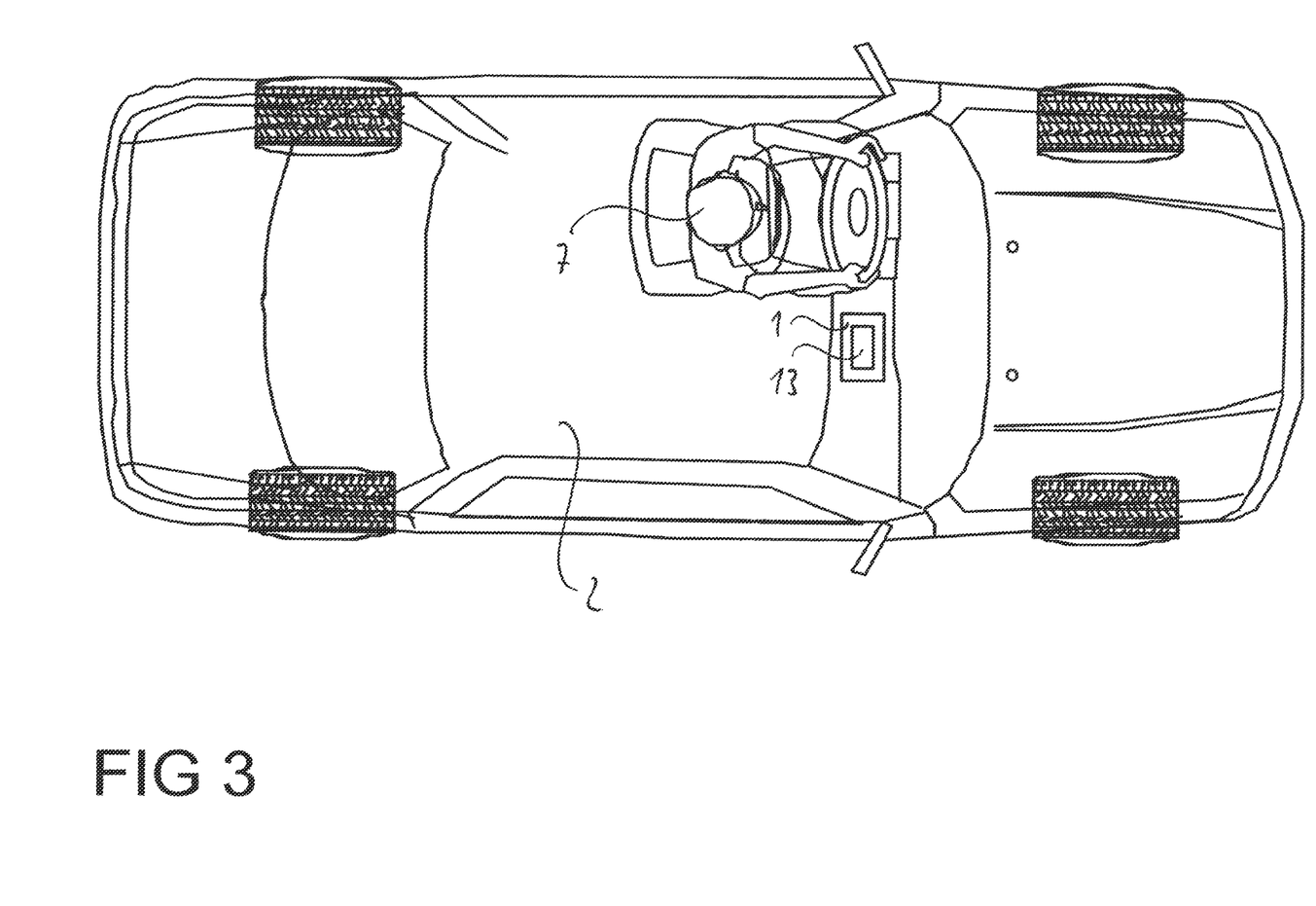
FIG. 3 shows a motor vehicle equipped with an audio system according to an embodiment of the present disclosure.

As will be explained with reference to the following figures, a music selection may be made automatically on the basis of the described driving behavior and road course data, which will be different at the two time points, because the music selected at the second time point is chosen from a second music category, which differs from the first music category, from which the selection is made at the first time point. For this purpose, FIG. 3 shows a vehicle 2 equipped with an audio system according to an embodiment of the present disclosure. As will be explained in more detail in the following, with audio system 1 a music selection is made on the basis of a current driving behavior of a driver 7 of vehicle 2. A user request by driver 7 of vehicle 2 to output a music item selected on the basis of the current driving behavior of a driver 7 may be made by making an entry via touchscreen 13 of audio system 1. Further details will be explained more closely with reference to FIG. 4.

Figure 4:
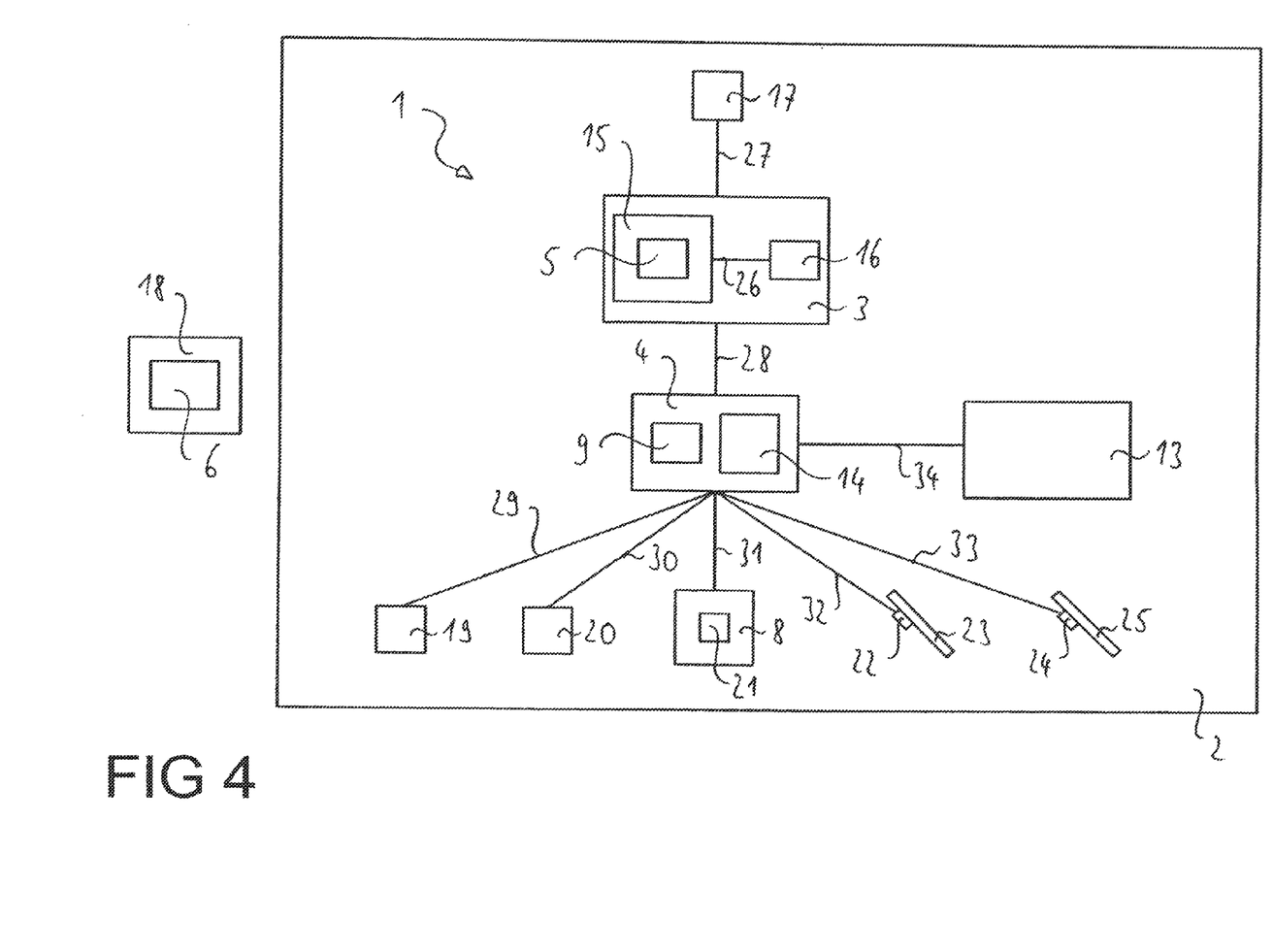
FIG. 4 shows components of the motor vehicle shown in FIG. 3.

FIG. 4 shows components of the vehicle 2 shown in FIG. 3, and particularly components of the audio system 1 of vehicle 2 according to one embodiment of the present disclosure. Components with the same functions as in FIG. 3 are denoted with the same reference signs, and will not be described again in the following. To ease understanding, the vehicle 2 in FIG. 4 is only represented diagrammatically. Audio system 1 is for example an information and entertainment system in vehicle 2, and is also called an infotainment system.

Audio system 1 includes an output system 3, which is designed to output audio signals. For this purpose, output device 3 in the embodiment shown includes a readout device 15 and at least one loudspeaker 16. Readout device 15 is connected to the at least one loudspeaker 16 via a signal wire 26 and is designed to be able to retrieve or read out at least one music item from a storage device 5, which is arranged inside vehicle 2. For this purpose, readout device 15 includes a CD player, for example, and storage device 5 has the form of an audio CD. Additionally, output device 3 in the embodiment shown is designed to retrieve music items from a storage device 6 located outside of the vehicle. For this purpose, output device 3 is connected to a communication unit 17 of vehicle 2 via a signal wire 27. Storage device 6 outside of the vehicle is for example a component of a server 18.

Audio system 1 also includes a computing unit 4. Computing unit 4 includes a computer-readable medium 9 and a processing unit 14. Processing unit 14 may have the form of an electronic processor, for example, particularly a microprocessor, a microcontroller or an application-specific integrated circuit (ASIC). Computer-readable medium 9 may be in the form of a flash memory, for example. A software product is stored on a computer-readable medium 9, and when it runs on computing unit 4 it instructs computing unit 4 to carry out the steps described previously in the context of the embodiments of the method, particularly the steps of the method shown in FIG. 1.

For this purpose, computing unit 4 is connected to output device 3 via a signal wire 28. This enables computing unit 4 to receive instructions for determining an audio profile of the at least one music item retrieved via output device 3, and to classify the at least one music item in at least one of a plurality of predefined music categories on the basis of the audio profile determined. An assignment of the at least one music item may then be created in at least one of the plurality of predetermined music categories in computing unit 4, and stored thereon.

Computing unit 4 is also connected to a driving mode controller 8 of vehicle 2 via a signal wire 31. The driver of vehicle 2 is able to choose a corresponding driving mode via a control element 21 of driving mode controller 8, for example a "sport/tour switch" as it is known. In this context, for example, a harder suspension setting and faster response be the steering system of the vehicle 2 is obtained by switching to a "sport mode" with driving mode controller 8. In a "tour mode", the suspension is automatically adjusted to a softer setting by means of driving mode controller 8. The steering is also adjusted driving mode controller 8 so that it responds less aggressively.

Computing unit 4 is also connected to a sensor 22 via a signal wire 32, which sensor is designed to detect a degree of depression of an accelerator pedal 23 of vehicle 2. Computing unit 4 is also connected to a sensor 24 via a signal wire 33, which sensor is designed to detect a degree of depression of a brake pedal 25 of vehicle 2. Computing unit 4 is instructed to classify the current driving behavior of the driver of vehicle 2 on the basis of data acquired by sensors 19, 20 22 and 24, and on the basis of the setting of driving mode controller 8. Computing unit 4 is also instructed to select the category from the plurality of predefined music categories on the basis of the classified current driving behavior of the driver, and to output at least one music item from the selected category via output device 3. Computing unit 4 is also connected to touchscreen 13 via a signal wire 34. In this way, a user request to output music items selected on the basis of the current driving behavior of the driver may be made by making a corresponding entry on touchscreen 13.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An audio system for a motor vehicle comprising:
an output device configured to output audio signals;
a computing unit and a software product that, when running on the computing unit instructs the computing unit to perform the following:
retrieve at least one music item from at least one storage device;
determine an audio profile for the at least one music item;
classify the at least one music item in at least one of a music categories on the basis of the determined audio profile;
determine at least one driving parameter that characterizes a current driving behavior of the driver of the motor vehicle;
classify the current driving behavior of the driver on the basis of the at least one determined parameter;
select a category from the plurality of predefined music categories on the basis of the classified current driving behavior of the driver; and
output the at least one music item included in the selected category via the output device,
wherein the software product instructs the computing unit to determine a stage profile for a stage of a journey currently being travelled by the vehicle, and wherein the selection of the category from the plurality of predefined music categories is made on the basis of the classified current driving behavior of the driver and on the basis of the determined stage profile.

2. The audio system according to claim 1, wherein the audio profile of the at least one music comprises at least one of a volume profile and a tempo profile tier the at least one music item.

3. The audio system according to claim 1, wherein the at least one driving parameter comprises at least one parameter selected from the group consisting of a speed of the vehicle, an acceleration of the vehicle, a steering angle, an accelerator pedal position, a brake pedal position and a setting of driving mode controller.

4. The audio system according to claim 1, the at least one music item is retrieved from a storage device located outside of the motor vehicle.

5. The audio system according to claim 1, wherein the output of the at least one music item begins at a predefined point in the music item.

6. The audio system according to claim 1, wherein the selection of the category from the plurality of predefined music categories is made by a user input on the basis of a user-specified assignment of at least one category of the plurality of predefined music categories to at least one behavior category of a plurality of predefined driving behavior categories.

7. The audio system according to claim 1, wherein the software product instructs the computing unit to determine a stage profile for a stage of a journey the vehicle is going to travel, and wherein the selection of the category from the plurality of predefined music categories is made on the basis of the classified current driving behavior of the driver and on the basis of the determined stage profile.

8. The audio system according to claim 1, wherein the software product instructs the computing unit to determine whether a user request to output a music item selected on the basis of the current driving behavior of the driver via the output device has been made, wherein the category is selected from the plurality of predefined music categories, and the at least one music item is output when a user request to output a music item selected on the basis of the current driving behavior of the driver via the output device has been made.

9. The audio system according to claim 8, wherein the output of the at least one music item takes place after a music item that is currently being output via the output device has ended.

10. The audio system according to claim 8, wherein the output of the at least one music item takes place immediately after the user request is confirmed.

11. A non-transitory computer-readable medium having a software product that, when running on a computing unit of an audio system in a vehicle having an output device configured to output audio signals, instructs the computing unit to perform the following:
retrieve at least one music item from at least one storage device;
determine an audio profile for the at least one music item;
classify the at least one music item in at least one of a plurality of predefined music categories on the basis of the determined audio profile;
determine at least one parameter that characterizes a current driving behavior of the driver of the motor vehicle;
classify the current driving behavior of the driver on the basis of the at least one determined parameter;
select a category from the plurality of predefined music categories on the basis of the classified current driving behavior of the driver; and
output the at least one music item included in the selected category via the output device,
wherein the software product instructs the computing unit to determine a stage profile for a stage of a the vehicle is going to travel, and the selection of the category from the plurality of predefined music categories is based on the classified current driving behavior of the driver and the determined stage profile.

12. A method for operating an adaptive audio system in a motor vehicle comprising:
retrieving at least one music item from a music storage device;
determining an audio profile for the at least one music item;
classifying the at least one music item in at least one of a plurality of predefined music categories on the basis of the audio profile;
determining at least one driving parameter characterizing a current driving behavior of the driver of the motor vehicle;
classifying the driving behavior on the basis of the at least one driving parameter;
selecting a category from the plurality of predefined music categories on the basis of the classified current driving behavior of the driver; and
outputting the at least one music item included in the selected category via an audio output device in the motor vehicle and beginning the output of the at least one music item at a predefined point in the music item.

13. The method according to claim 12 further comprising retrieving the at least one music item from a storage device located outside of the motor vehicle.

14. The method according to claim 12, further comprising selecting the category from the plurality of predefined music categories with a user input on the basis of a user-specified assignment of at least one category of the plurality of predefined music categories to at least one behavior category of a plurality of predefined driving behavior categories.

15. The method according to claim 12, further comprising determining a stage profile fur a stage of a journey currently being travelled by the vehicle, wherein the selection of the category from the plurality of predefined music categories is made on the basis of the classified current driving behavior of the driver and on the basis of the determined stage profile.

16. The method according to claim 12, further comprising determining a stage profile for a stage of a journey the vehicle is going to travel, wherein the selection of the category from the plurality of predefined music categories is made on the basis of the classified current driving behavior of the driver and on the basis of the determined stage profile.

17. The method according to claim 12, further comprising determining whether a user request to output a music item selected on the basis of the current driving behavior of the driver via the output device has been made, wherein the category is selected from the plurality of predefined music categories, and the at least one music item is output when a user request to output a music item selected on the basis of the current driving behavior of the driver via the output device has been made.

* * * * *